US005751276A

United States Patent [19]
Shih

[11] Patent Number: 5,751,276
[45] Date of Patent: May 12, 1998

[54] METHOD FOR CALIBRATING TOUCH PANEL DISPLAYS

[75] Inventor: Yung-Ho Shih, Bellevue, Wash.

[73] Assignee: Microsoft Corporation, Redmond, Wash.

[21] Appl. No.: 652,899

[22] Filed: May 23, 1996

[51] Int. Cl.$^6$ .................................................. G09G 5/00
[52] U.S. Cl. .................................................. 345/178
[58] Field of Search .................................. 345/156, 173, 345/174, 178

[56] References Cited

U.S. PATENT DOCUMENTS

| | | | |
|---|---|---|---|
| 4,710,758 | 12/1987 | Mussler et al. | 340/712 |
| 5,283,559 | 2/1994 | Kalendra et al. | 345/168 |
| 5,563,632 | 10/1996 | Roberts | 345/173 |

*Primary Examiner*—Mark R. Powell
*Assistant Examiner*—Vincent E. Kovalick
*Attorney, Agent, or Firm*—Lee & Hayes, PLLC

[57] ABSTRACT

A method for calibrating a touch panel display includes generating contact coordinates $(\bar{x}_i, \bar{y}_i, i=1, \ldots, N)$ indicative of N touch points of contact on the touch panel display, where N>3. The touch points can be selected at random on the touch panel, and are not constrained to specific, predefined locations. The contact coordinates $(\bar{x}_i, \bar{y}_i)$ are related into screen coordinates $(\tilde{x}_i, \tilde{y}_i)$ according to the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i = 1, \ldots, N.$$

This mapping transformation accounts for all possible two-dimensional transformations including transposition, rotation, and shearing. After N sets of digitizer and screen coordinates are found, values for the parameters $a_1$, $b_1$, $c_1$, $a_2$, $b_2$, and $c_2$ are derived. Preferably, the parameters are determined using an optimizing algorithm, such as a least square fitting algorithm. The parameters $a_1$, $b_1$, $c_1$, $a_2$, $b_2$, and $c_2$ are stored and thereafter used for all mapping transformations.

13 Claims, 4 Drawing Sheets

METHOD FOR CALIBRATING TOUCH PANEL DISPLAYS

TECHNICAL FIELD

This invention relates to touch panel displays, and to methods for calibrating them.

BACKGROUND OF THE INVENTION

Touch panel displays are used in many computing devices, including portable computers, hand-held computers, and specially tailored computers for dedicated functions (e.g., point-of-purchase computers). Touch panel displays have a touch panel, which affords touch detection capabilities, overlaid on a display, which provides display capabilities. One common use of a touch panel display is to illustrate various menus or icons on a screen which represent available options. The user selects an option by touching the touch panel with a finger or stylus at the location of a corresponding depicted icon. Another common use of a touch panel display is to enable a user to hand write or draw images as a way to enter data.

When the touch panel is touched, a digitizer detects the point of contact and generates a pair of two-dimensional coordinates indicative of the contact point. The digitizer coordinates are converted into screen coordinates which the system software uses to process the touch event. The software might control a display driver to draw notes or images on the screen which correspond to the user's input, or to activate an option corresponding to a touched icon.

A problem arises when the screen coordinates do not match the digitizer coordinates. The user touches one point on the touch panel, but the resultant display of that point is displaced from the actual point of contact. This problem manifests as a drifting line phenomenon in which the visually depicted line drifts from the actual line being traced on the touch panel. In a menu mode, the problem is manifest by activation of options associated with icons that neighbor the selected icon.

Touch panel displays are calibrated to coincide the digitizer and screen coordinates. However, calibration presents a unique set of problems for touch panel displays. For other pointing devices, such as a mouse, the system predetermines a mapping function. Digitized mouse coordinates are mapped first into display coordinates. A visual feedback, usually in the shape of an arrow or other pointer, is displayed on the screen using the mapping function. The user then clicks the mouse button and the computer accepts the current display location as the clicked target. In this manner, no calibration is needed.

Unfortunately, there is no visual feedback mechanism in a touch panel display that ensures a match between the screen and digitizer coordinates. A specific mapping function cannot be pre-determined. Instead, touch panel displays must be calibrated to determine the mapping function. Once determined, the mapping function is employed to transform all subsequent digitized touch-panel coordinates to display coordinates.

FIG. 1 illustrates a touch panel display 20 which uses a prior art calibration method. The touch panel display 20 has a touch panel overlaid on a display screen. The user is asked to touch the touch panel at four target points—labeled 1, 2, 3, and 4 on the display. From these preset locations, the touch panel display computes a mapping function.

As shown in FIG. 2, the touch panel 21 can be modeled as ohmic, or linear, resistors in the form of two touch-panel planes 22 and 24. A first voltage 26 is applied across the upper plane 22 and a second voltage 28 is applied across the lower plane 24. The two voltages are applied in orthogonal directions. When the upper plane 22 is touched, either by a finger or stylus, a point of contact is made between the two planes 22 and 24. An ohmic change is detected along each of the planes. Due to the orthogonal orientation of the panels, the ohmic paths 30 and 32 criss-cross to identify the contact point. This contact point is then digitized by hardware to generate the digitized coordinates.

FIG. 3 shows a conceptual circuit the touch panel display 20. It includes the touch panel 21, a digitizer 34, and a processor 36. Contact on the touch planes 22 and 24 forms a contact point 38. The digitizer 34, which includes a capacitor 40 and an A/D converter 42, produces digitized coordinates indicative of the contact point 38. A time-domain multiplexing is used to sample X and Y coordinates. Accurate sampling depends upon there being enough time for the capacitor to be charged and discharged. The coordinates are sent to the processor 36 for mapping. The processor 36 uses a mapping finction to map the digitizer coordinates onto screen coordinates which are then employed for further processing.

Since the touch panel is ohmic, or linear, the prior art touch panel displays make an assumption that the two planes 22 and 24 are independent. As a result, the prior art touch panel displays independently map the X and Y coordinates using the following transform:

$$\begin{cases} x_i = a\bar{x}_i + c_1 \\ y_i = b\bar{y}_i + c_2 \end{cases}$$

where $\bar{x}_i$ and $\bar{y}_i$, denote the digitizer coordinates and $x_i$ and $y_i$, represent the screen coordinates.

The parameters a, b, $c_1$, and, $c_2$ are determined through a process known as "touch-panel calibration." To solve for these parameters, four equations are needed. The user is asked to touch three or four pre-drawn targets on the display one-by-one. FIG. 1 shows a commonly used rectangular pattern in which the user sequentially contacts all four targets 1, 2, 3, and 4. Each contact point defines a set of digitizer coordinates ($\bar{x}_i$, $\bar{y}_i$) and converted screen coordinates ($x_i$,$y_i$). The four-corner method generates more than four equations, so more than one set of parameters can then be determined. The final parameters are an average of the parameter sets. Once calibrated, all the touch device coordinates are mapped to the display coordinates through the mapping function.

Unfortunately, the assumption that X and Y samples are independent can be invalid. The sampling time between sampling each X and Y coordinate for the same set of coordinates cannot be large. Designs typically account for this limitation. However, for larger touch panel displays, a large time constant occurs due to different touch-panel resistance and the time between X and Y sampling for the same set of coordinates can be insufficient to adequately discharge the capacitor 40. As a result, the second sample in a set, usually the Y coordinate, might be inaccurate because there is still residual charge, left by sampling the X coordinate, on the capacitor 40 when the Y coordinate is sampled.

There are other situations in which the assumption of independent samples can be violated. For example, in a hand-held device, timing changes occur as the battery is drained, causing the assumption to be inaccurate. Additionally, the orientation of the touch-panel relative to the display is important in prior art devices. For X and Y to be truly independent, the touch-panel must be precisely aligned with the display. If there is any translation or rotation, the assumption is no longer valid.

Accordingly, there is a need for an improved touch-panel calibration technique that does not depend upon the assumption that the X and Y samples be truly independent.

SUMMARY OF THE INVENTION

This invention concerns a new method for calibrating a touch panel display. According to one aspect of this invention, the calibration method includes generating contact coordinates ($\bar{x}_i$, $\bar{y}_i$, i=1, . . . , N) indicative of N touch points of contact on the touch panel display, where N>3. These touch points can be selected at random on the touch panel, and are not constrained to specific, predefined locations. The contact coordinates ($\bar{x}_i$, $\bar{y}_i$) are related to screen coordinates ($x_i$, $y_i$) according to the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i = 1, \ldots, N.$$

This mapping transformation accounts for all possible two-dimensional transformations including transposition, rotation, and shearing. After N sets of screen and contact coordinates ($\bar{x}_i$, $\bar{y}_i$) and ($X_i$, $y_i$) are found, the parameters $a_1$, $b_1$, $c_1$, $a_2$, $b_2$, and $c_2$ are derived. Preferably, the parameters are determined using an optimizing algorithm, such as a least square fitting algorithm. The parameters $a_1$, $b_1$, $c_1$, $a_2$, $b_2$, and $c_2$ are stored and thereafter used for all mapping transformations.

The mapping transform does not rely on the assumption that X and Y are independent. As a result, the production yield of touch panel displays can be improved because devices with misaligned touch panels relative to displays can be accommodated through the calibration and need not be discarded. Additionally, when battery reserves of a handheld device near depletion, the mapping transform continues to allow correct operation by the user.

DETAILED DESCRIPTION OF THE PREFERRED EMBODIMENT

Figure 1:
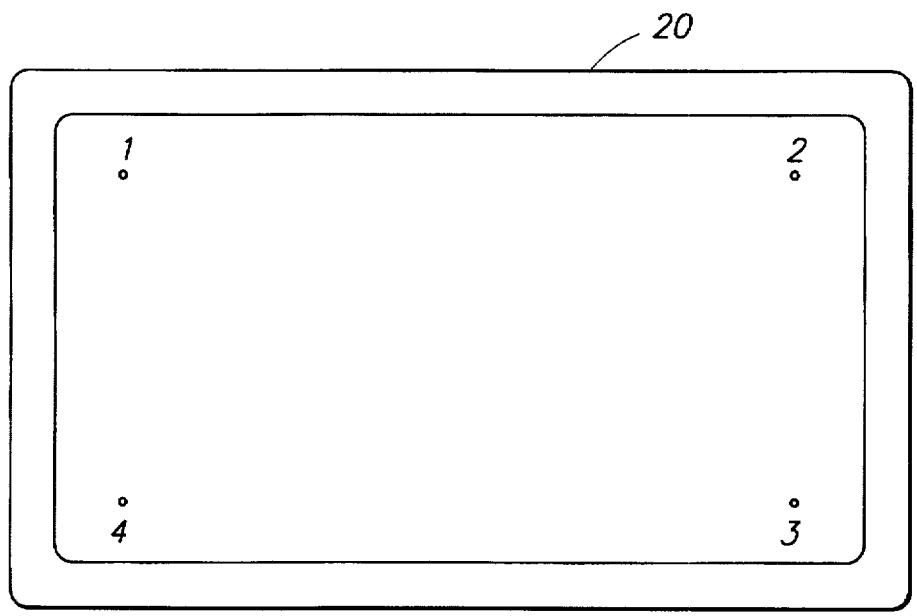
FIG. 1 is a diagrammatic illustration of a touch panel display, showing a prior art calibration pattern.
Figure 2:
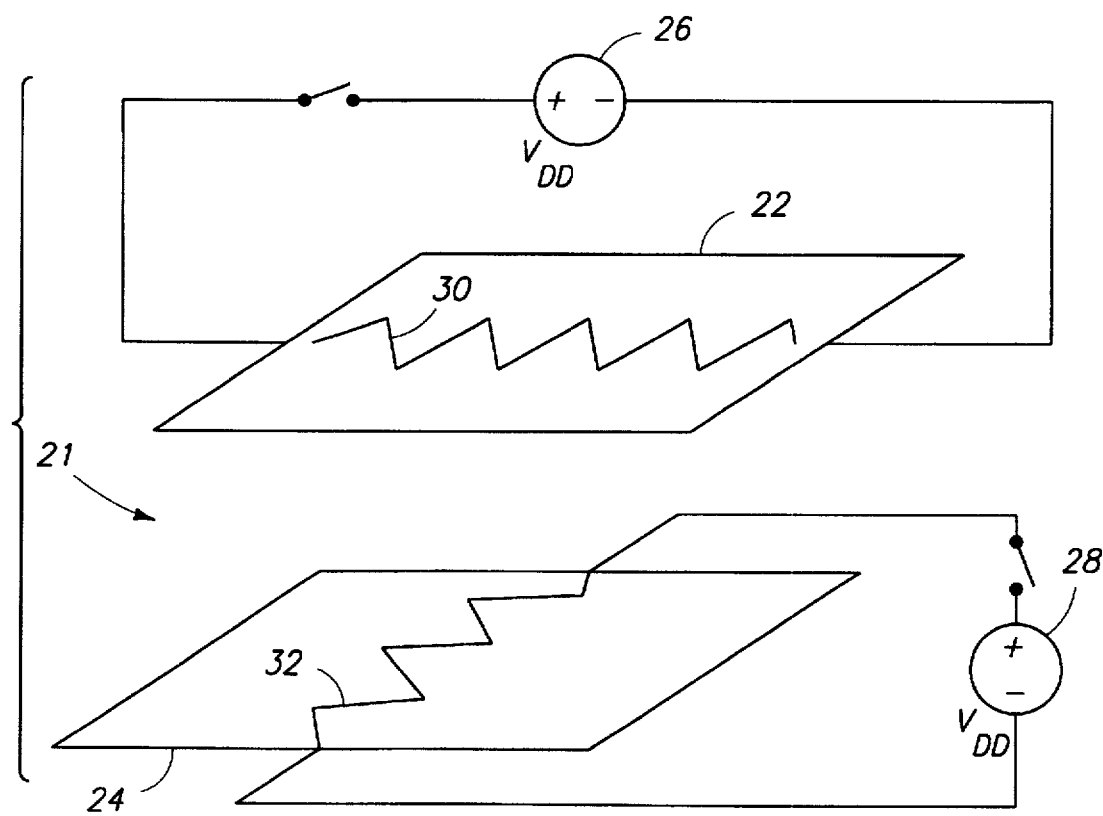
FIG. 2 is a modeled representation of a conventional touch panel.
Figure 3:
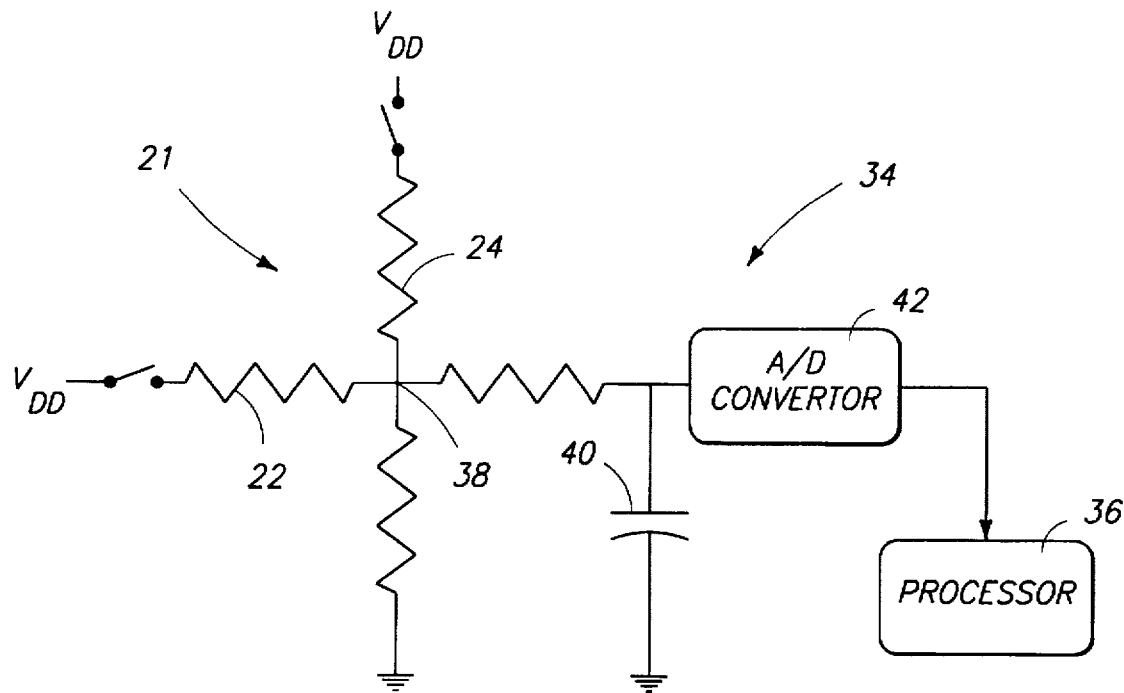
FIG. 3 is a diagrammatic illustration of a prior art touch panel circuit.
Figure 4:
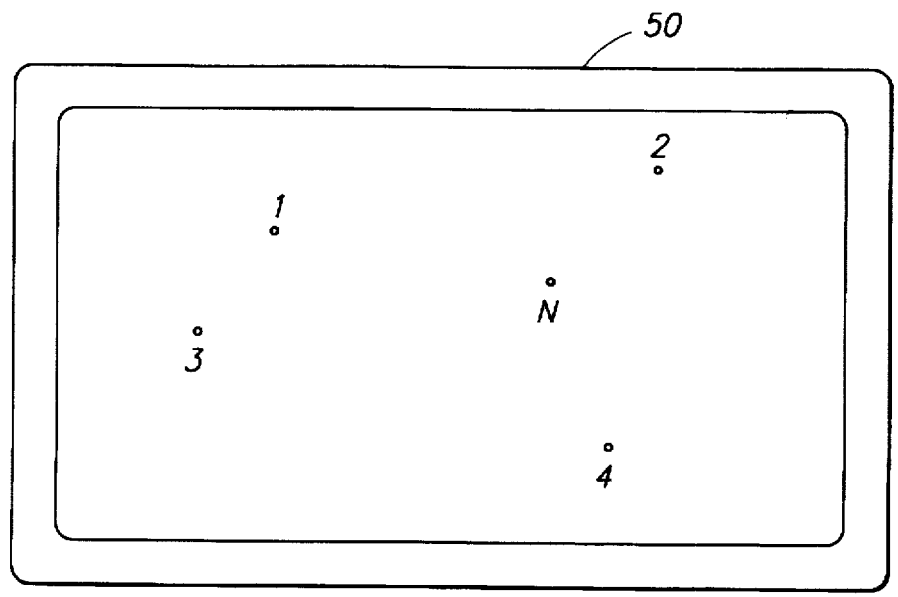
FIG. 4 is a diagrammatic illustration of a touch panel display, showing an example calibration pattern.

FIG. 4 shows a touch panel display device 50 which uses a calibration method according to an aspect of this invention. The touch panel display device 50 has a touch panel superimposed on a display screen. During calibration, the touch panel display device draws N preset target points—labeled 1, 2, 3, 4, . . . , N—which are depicted on the screen. The target points can be randomly selected, and need not form any predefined symmetric shape, such as a rectangle. At least three points are required (i.e., N≧3), and better accuracy is attained with more calibration points. The user is asked to touch the touch panel at the N preset target points.

Figure 5:
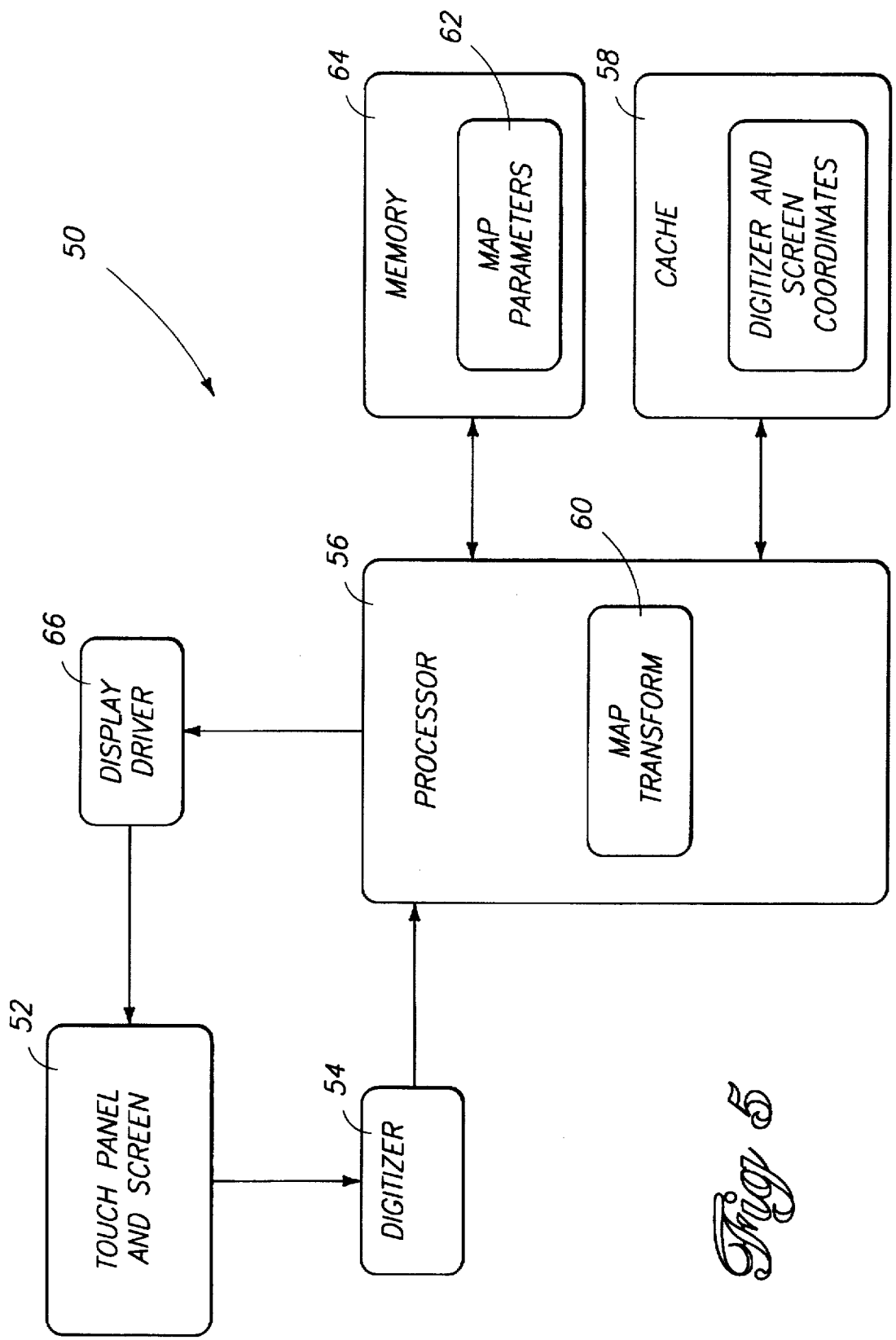
FIG. 5 is a block diagram of a touch panel display according to one aspect of this invention.

FIG. 5 shows a functional block diagram of the touch panel display device 50. It includes a superimposed touch panel and screen 52. The overlying touch panel is sensitive to contact by a finger or stylus, and the underlying screen is a display device, such as an LCD screen. A digitizer 54 is coupled to the touch panel and screen 52. The digitizer 54 detects points of contact on the touch panel and generates digitizer coordinates ($\bar{x}_i$, $\bar{y}_i$) indicative of the contact points . During calibration, there will be N contact points and hence, N pairs of digitizer coordinates ($\bar{x}_i$, $\bar{y}_i$). As each pair is produced, the digitizer coordinates are input to a processor 56 and cached in a cache memory 58.

After the digitizer collects N pairs of digitizer coordinates for the corresponding N pairs of preset screen coordinates, the processor 56 is programmed to determine a mapping relationship between the digitizer coordinates ($\bar{x}_i$, $\bar{y}_i$) and the screen coordinates ($x_i$, $y_i$) using a mapping transformation 60 as follows:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i = 1, \ldots, N.$$

The corresponding N pairs of digitizer and screen coordinates provide N sets of mapping equations. The processor 56 is programmed to solve the equations and derive values for the mapping parameters $a_1$, $b_1$, $c_1$, $a_2$, $b_2$ and $c_2$, that enable the digitizer coordinates to map precisely onto the screen coordinates. Preferably, the parameters are derived using an optimizing algorithm, such as a least square fitting algorithm or a least maximum fitting algorithm. This latter algorithm is also known as Chebichev algorithm.

The calculated mapping parameters 62 are stored in memory 64, which is preferably non-volatile (such as an EEPROM, or other persistent memory). The parameters can be stored in volatile memory, but would then need to be calibrated each time the device boots. It is noted that the memory 64 is also used to store the original screen coordinates used to draw the initial N points on the screen during calibration.

Following calibration, the touch panel display device 50 uses the mapping parameters 62 from memory 64 in the mapping transform 60 to convert all digitizer coordinates into screen coordinates. The processor 56 uses the converted coordinates to deduce and process the touch event. Example events might include selection of a soft button, or drawing a mark. If the touch event corresponds to drawing a mark, the processor 56 outputs the screen coordinates to display driver 66 which in turn produces display data used to control screen 52 to depict the mark.

For purposes of continuing discussion, derivation of the mapping parameters $a_1$, $b_1$, $c_1$, $a_2$, $b_2$, and $c_2$ is described using the example least squares fitting technique. To solve for $a_1$, $b_1$, $c_1$, $a_2$, $b_2$, and $c_2$, three independent sets of digitizer and screen coordinates are required since the mapping function consists of two equations. Given N calibration points, N≧3, the mapping parameters are determined $a_1$, $b_1$, $c_1$, $a_2$, $b_2$, and $c_2$ such that the summation of the distances between the mapped screen point and the corresponding screen point is minimized. Mathematically, this is expressed as minimizing the following function:

$$f(\vec{p}) = \sum_{i=1}^{N} [(a_1\bar{x}_i + b_1\bar{y}_i + c_1 - \hat{x}_i)^2 + (a_2\bar{x}_i + b_2\bar{y}_i + c_2 - \hat{y}_i)^2]$$

where, $\vec{p} = (a_1, b_1, c_1, a_2, b_2, c_2)$.

At minimum, $$\frac{\partial f}{\partial p} = 0.$$

Therefore, we have:

$$\begin{cases} a_1\left(\sum_{i=1}^{N}\bar{x}_i^2\right)+b_1\left(\sum_{i=1}^{N}\bar{x}_i\bar{y}_i\right)+c_1\left(\sum_{i=1}^{N}\bar{x}_i\right)-\sum_{i=1}^{N}\hat{x}_i\bar{x}_i=0 \\ a_1\left(\sum_{i=1}^{N}\bar{x}_i\bar{y}_i\right)+b_1\left(\sum_{i=1}^{n}\bar{y}_i^2\right)+c_1\left(\sum_{i=1}^{N}\bar{y}_i\right)-\sum_{i=1}^{N}\hat{y}_i\bar{x}_i=0 \\ a_1\left(\sum_{i=1}^{N}\bar{x}_i\right)+b_1\left(\sum_{i=1}^{N}\bar{y}_i\right)+c_1 N-\sum_{i=1}^{N}\hat{x}_i=0 \\ a_2\left(\sum_{i=1}^{N}\bar{x}_i^2\right)+b_2\left(\sum_{i=1}^{N}\bar{x}_i\bar{y}_i\right)+c_2\left(\sum_{i=1}^{N}\bar{x}_i\right)-\sum_{i=1}^{N}\bar{x}_i\bar{y}_i=0 \\ a_2\left(\sum_{i=1}^{N}\bar{x}_i\bar{y}_i\right)+b_2\left(\sum_{i=1}^{n}\bar{y}_i^2\right)+c_2\left(\sum_{i=1}^{N}\bar{y}_i\right)-\sum_{i=1}^{N}\bar{y}_i\hat{y}_i=0 \\ a_2\left(\sum_{i=1}^{N}\bar{x}_i\right)+b_2\left(\sum_{i=1}^{N}\bar{y}_i\right)+c_2 N-\sum_{i=1}^{N}\hat{y}_i=0 \end{cases}$$

Let, $$\Delta = \begin{vmatrix} \left(\sum_{i=1}^{N}\bar{x}_i^2\right) & \left(\sum_{i=1}^{N}\bar{x}_i\bar{y}_i\right) & \left(\sum_{i=1}^{N}\bar{x}_i\right) \\ \left(\sum_{i=1}^{N}\bar{x}_i\bar{y}_i\right) & \left(\sum_{i=1}^{N}\bar{y}_i^2\right) & \left(\sum_{i=1}^{N}\bar{y}_i\right) \\ \left(\sum_{i=1}^{N}\bar{x}_i\right) & \left(\sum_{i=1}^{N}\bar{y}_i\right) & N \end{vmatrix},$$

$$\Delta_1 = \begin{vmatrix} \left(\sum_{i=1}^{N}\hat{x}_i\bar{x}_i\right) & \left(\sum_{i=1}^{N}\bar{x}_i\bar{y}_i\right) & \left(\sum_{i=1}^{N}\bar{x}_i\right) \\ \left(\sum_{i=1}^{N}\hat{y}_i\bar{x}_i\right) & \left(\sum_{i=1}^{N}\bar{y}_i^2\right) & \left(\sum_{i=1}^{N}\bar{y}_i\right) \\ \left(\sum_{i=1}^{N}\hat{x}_i\right) & \left(\sum_{i=1}^{N}\bar{y}_i\right) & N \end{vmatrix},$$

$$\Delta_2 = \begin{vmatrix} \left(\sum_{i=1}^{N}\bar{x}_i^2\right) & \left(\sum_{i=1}^{N}\bar{x}_i\hat{x}_i\right) & \left(\sum_{i=1}^{N}\bar{x}_i\right) \\ \left(\sum_{i=1}^{N}\bar{x}_i\bar{y}_i\right) & \left(\sum_{i=1}^{N}\bar{y}_i\hat{x}_i\right) & \left(\sum_{i=1}^{N}\bar{y}_i\right) \\ \left(\sum_{i=1}^{N}\bar{x}_i\right) & \left(\sum_{i=1}^{N}\hat{x}_i\right) & N \end{vmatrix},\text{ and}$$

$$\Delta_3 = \begin{vmatrix} \left(\sum_{i=1}^{N}\bar{x}_i^2\right) & \left(\sum_{i=1}^{N}\bar{x}_i\bar{y}_i\right) & \left(\sum_{i=1}^{N}\bar{x}_i\hat{x}_i\right) \\ \left(\sum_{i=1}^{N}\bar{x}_i\bar{y}_i\right) & \left(\sum_{i=1}^{N}\bar{y}_i^2\right) & \left(\sum_{i=1}^{N}\bar{y}_i\hat{x}_i\right) \\ \left(\sum_{i=1}^{N}\bar{x}_i\right) & \left(\sum_{i=1}^{N}\bar{y}_i\right) & \left(\sum_{i=1}^{N}\hat{x}_i\right) \end{vmatrix},$$

then, $$a_1 = \frac{\Delta_1}{\Delta},\ b_1 = \frac{\Delta_2}{\Delta},\text{ and } c_1 = \frac{\Delta_3}{\Delta}.$$

-continued

Similarly, let $$\Delta_4 = \begin{vmatrix} \left(\sum_{i=1}^{N}\hat{x}_i\bar{y}_i\right) & \left(\sum_{i=1}^{N}\bar{x}_i\bar{y}_i\right) & \left(\sum_{i=1}^{N}\bar{x}_i\right) \\ \left(\sum_{i=1}^{N}\hat{y}_i\bar{y}_i\right) & \left(\sum_{i=1}^{N}\bar{y}_i^2\right) & \left(\sum_{i=1}^{N}\bar{y}_i\right) \\ \left(\sum_{i=1}^{N}\hat{y}_i\right) & \left(\sum_{i=1}^{N}\bar{y}_i\right) & N \end{vmatrix},$$

$$\Delta_5 = \begin{vmatrix} \left(\sum_{i=1}^{N}\bar{x}_i^2\right) & \left(\sum_{i=1}^{N}\bar{x}_i\hat{y}_i\right) & \left(\sum_{i=1}^{N}\bar{x}_i\right) \\ \left(\sum_{i=1}^{N}\bar{x}_i\bar{y}_i\right) & \left(\sum_{i=1}^{N}\bar{y}_i\hat{y}_i\right) & \left(\sum_{i=1}^{N}\bar{y}_i\right) \\ \left(\sum_{i=1}^{N}\bar{x}_i\right) & \left(\sum_{i=1}^{N}\hat{y}_i\right) & N \end{vmatrix},\text{ and}$$

$$\Delta_6 = \begin{vmatrix} \left(\sum_{i=1}^{N}\bar{x}_i^2\right) & \left(\sum_{i=1}^{N}\bar{x}_i\bar{y}_i\right) & \left(\sum_{i=1}^{N}\bar{x}_i\hat{y}_i\right) \\ \left(\sum_{i=1}^{N}\bar{x}_i\bar{y}_i\right) & \left(\sum_{i=1}^{N}\bar{y}_i^2\right) & \left(\sum_{i=1}^{N}\bar{y}_i\hat{y}_i\right) \\ \left(\sum_{i=1}^{N}\bar{x}_i\right) & \left(\sum_{i=1}^{N}\bar{y}_i\right) & \left(\sum_{i=1}^{N}\hat{y}_i\right) \end{vmatrix},$$

then, $$a_2 = \frac{\Delta_4}{\Delta},\ b_2 = \frac{\Delta_5}{\Delta},\text{ and } c_2 = \frac{\Delta_6}{\Delta}.$$

Once the parameters are derived, they are maintained in memory 64 and used by the mapping transform thereafter for subsequent conversions of digitizer coordinates into screen coordinates.

Figure 6:
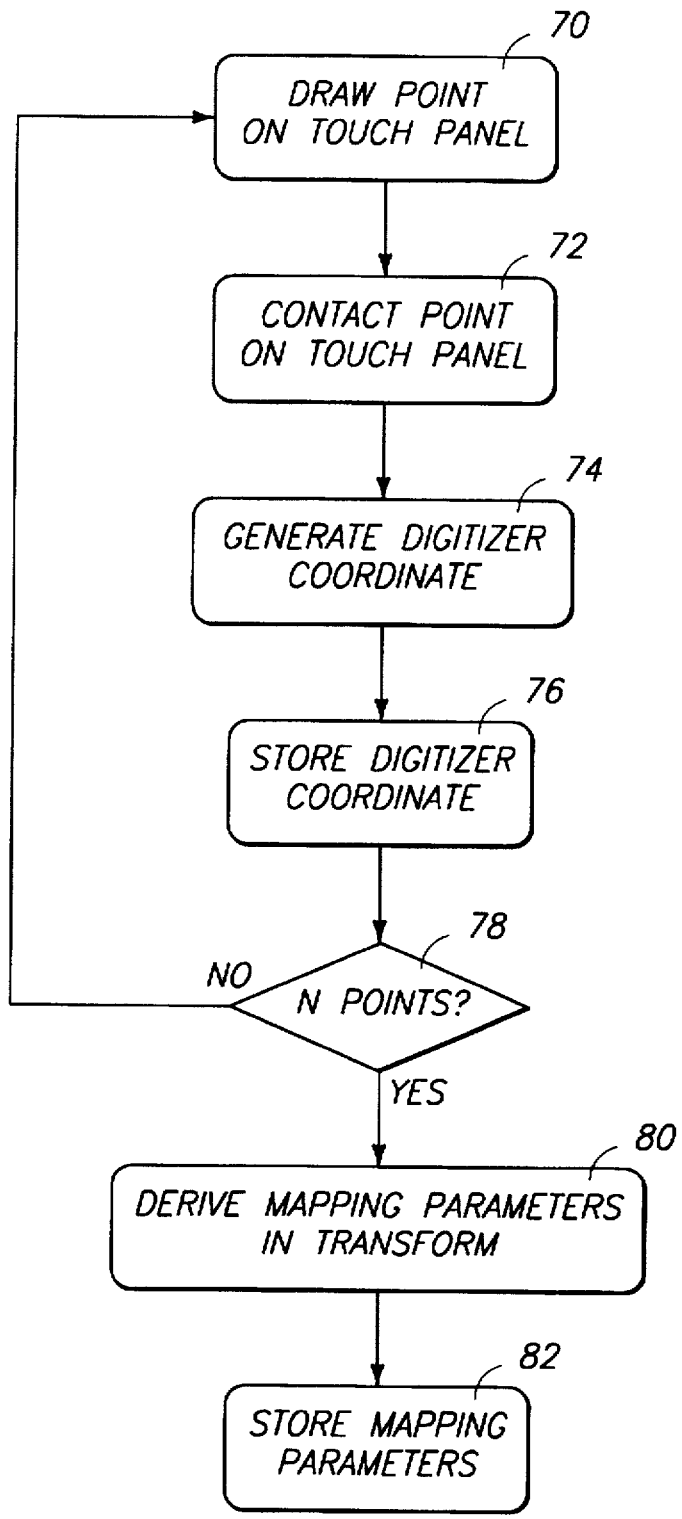
FIG. 6 is a flow diagram of a method for calibrating a touch panel display according to another aspect of this invention.

FIG. 6 shows a method for calibrating the touch panel display device 50. The device 50 is placed in an initializing or calibration mode. At step 70, the touch panel display device 50 draws a preset target point on the screen (say, touch point 1 in FIG. 4) using a pair of screen coordinates stored in memory 64. The user contacts the touch panel display at a touch point (step 72). From this contact, the digitizer 54 generates contact coordinates $(\bar{x}_1,\bar{y}_1)$ indicative of the touch point (step 74 in FIG. 6). This pair of contact coordinates $(\bar{x}_1,\bar{y}_1)$ is stored in cache memory 58 (step 76). This process is then repeated for N touch points, as indicated by the "no" branch from decision step 78.

When N touch points have been drawn on the screen, and N pairs of contact coordinates $(\bar{x}_1,\bar{y}_1),(\bar{x}_2,\bar{y}_2),\ldots,(\bar{x}_n,\bar{y}_N)$ have been generated and stored in memory 58, flow continues to step 80. The processor 56 can formulate N sets of equations from the corresponding screen and digitizer coordinates using the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i = 1,\ldots,N.$$

At step 80, values for the mapping parameters $a_1$, $b_1$, $c_1$, $a_2$, $b_2$, and $c_2$ are derived using an optimizing program, such as the above-described least squares fitting algorithm. The values for the mapping parameters are stored in memory 64 (step 82). The touch panel display device is then switched from its calibration mode to a normal operating mode. All future touch inputs are converted using the mapping transformation given above, and the values for the mapping parameters stored in memory 64.

The calibration method is beneficial because it does not rely on the assumption that the X and Y plane samples are independent. Further, there is no constraint as to the number of calibrating points or the location of them. The method further accounts for all possible two-dimensional transformations including transposition, rotation, and shearing.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. A method for calibrating a touch panel display, comprising the following steps:

generating N contact coordinates $(\bar{x}_i, \bar{y}_i, i=1, \ldots, N)$ in response to contact at N touch points on the touch panel display, where N>3;

mapping the contact coordinates $(\bar{x}_i, \bar{y}_i)$ into screen coordinates $(x_i, y_i)$ according to the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i=1, \ldots, N.$$

2. A method as recited in claim 1 and further comprising the step of deriving parameters $a_1, b_1, c_1, a_2, b_2$ and $c_2$ using the contact and screen coordinates.

3. A method as recited in claim 1 and further comprising the step of deriving parameters $a_1, b_1, c_1, a_2, b_2$, and $c_2$ using an optimizing algorithm.

4. A method as recited in claim 1 and further comprising the step of deriving parameters $a_1, b_1, c_1, a_2, b_2$, and $c_2$ using a least squares fitting algorithm.

5. A method for calibrating a touch panel display, comprising the following steps:

displaying N touch points on the touch panel display using N screen coordinates $(x_i, y_i, i=1, \ldots, N)$, where N>3;

generating N contact coordinates $(\bar{x}_i, \bar{y}_i, i=1, \ldots, N)$ in response to contact at the N touch points on the touch panel display;

relating the contact coordinates $(\bar{x}_i, \bar{y}_i)$ to the screen coordinates $(x_i, y_i)$ according to the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i=1, \ldots, N$$

deriving parameters $a_1, b_1, c_1, a_2, b_2$, and $c_2$ using the contact and screen coordinates and the mapping transformation; and storing the parameters $a_1, b_1, c_1, a_2, b_2$, and $c_2$.

6. A method as recited in claim 5 wherein the deriving step comprises computing the parameters $a_1, b_1, c_1, a_2, b_2$, and $c_2$ using an optimizing algorithm.

7. A method as recited in claim 5 wherein the deriving step comprises computing the parameters $a_1, b_1, c_1, a_2, b_2$ and $c_2$ using a least squares fitting algorithm.

8. A method as recited in claim 5 and further comprising the step of subsequently mapping the contact coordinates $(\bar{x}_i, \bar{y}_i)$ into screen coordinates $(x_i, y_i)$ using the stored parameters $a_1, b_1, c_1, a_2, b_2$, and $c_2$.

9. A method for calibrating a touch panel display, comprising the following steps:

(a) displaying a touch point on the touch panel display according to a screen coordinate $(x_i, y_i)$;

(b) contacting the touch panel display at the touch point;

(c) generating contact coordinates $(\bar{x}_i, \bar{y}_i)$ indicative of the touch point;

(d) storing the contact coordinates $(\bar{x}_i, \bar{y}_i)$;

(e) repeating steps (a)–(d) for N touch points;

(f) formulating a mapping relationship that maps the N stored contact coordinates $(\bar{x}_i, \bar{y}_i)$ into the N screen coordinates $(x_i, y_i)$ according to the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i=1, \ldots, N$$

(f) deriving parameters $a_1, b_1, c_1, a_2, b_2$, and $c_2$ using the contact and screen coordinates and the mapping transformation; and (g) storing the parameters $a_1, b_1, c_1, a_2, b_2$, and $c_2$.

10. A touch panel display device comprising:

a touch panel and a screen;

a digitizer to detect points of contact on the touch panel and to generate digitizer coordinates $(\bar{x}_i, \bar{y}_i)$ indicative of the contact points;

a processor programmed to map the digitizer coordinates $(\bar{x}_i, \bar{y}_i)$ from the digitizer onto screen coordinates $(x_i, y_i)$ for depiction on the screen using the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i=1, \ldots, N.$$

11. A touch panel display device as recited in claim 10 wherein the processor is further programmed to derive parameters $a_1, b_1, c_1, a_2, b_2$, and $c_2$ using the digitizer and screen coordinates and the mapping transformation.

12. A touch panel display device as recited in claim 11, further comprising a memory to store the parameters $a_1, b_1, c_1, a_2, b_2$, and $c_2$.

13. A touch panel display that is calibrated by mapping contact coordinates $(\bar{x}_i, \bar{y}_i)$ indicative of N touch points, where n≧3, into screen coordinates $(x_i, y_i)$ according to the following mapping transformation:

$$\begin{cases} x_i = a_1\bar{x}_i + b_1\bar{y}_i + c_1 \\ y_i = a_2\bar{x}_i + b_2\bar{y}_i + c_2 \end{cases} \text{ where } i=1, \ldots, N.$$

\* \* \* \* \*